United States Patent
Schleeter

(10) Patent No.: US 6,282,746 B1
(45) Date of Patent: Sep. 4, 2001

(54) BLOWER ASSEMBLY

(75) Inventor: Keith M. Schleeter, Bloomington, MN (US)

(73) Assignee: Auto Butler, Inc., Minneapolis, MN (US)

( * ) Notice: Subject to any disclaimer, the term of this patent is extended or adjusted under 35 U.S.C. 154(b) by 0 days.

(21) Appl. No.: 09/470,226

(22) Filed: Dec. 22, 1999

(51) Int. Cl.[7] .................................................. A47L 5/38
(52) U.S. Cl. ............................ 15/302; 15/312.1; 15/317
(58) Field of Search .................................. 15/302, 312.1, 15/316.1, 317, 405; 34/666

(56) References Cited

U.S. PATENT DOCUMENTS

| | | | |
|---|---|---|---|
| 2,637,873 | 5/1953 | Berezny | 15/302 |
| 2,695,039 | * 11/1954 | Holtzclaw | 15/312.1 |
| 2,976,557 | 3/1961 | King, Jr. | 15/312.1 |
| 2,981,644 | * 4/1961 | Fain | 15/312.1 |
| 4,161,801 | 7/1979 | Day et al. | 15/316.1 |
| 4,393,602 | 7/1983 | Smith | 15/316.1 |
| 4,587,688 | 5/1986 | Gougoulas | 15/316.1 |
| 4,685,169 | * 8/1987 | Nelson | 15/302 |
| 4,817,301 | * 4/1989 | Belanger et al. | 15/316.1 |
| 4,979,316 | * 12/1990 | Belanger et al. | 15/316.1 |
| 5,367,739 | 11/1994 | Johnson | 15/316.1 |
| 6,000,095 | * 12/1999 | Johnson | 15/316.1 |

* cited by examiner

Primary Examiner—Robert J. Warden, Sr.
Assistant Examiner—Theresa T. Snider
(74) Attorney, Agent, or Firm—Patterson, Thuente, Skaar & Christensen, P.A.

(57) ABSTRACT

A blower assembly for an automatic car wash is provided. The blower assembly includes a housing, an impeller, a fan motor, an oscillation motor and an oscillation linkage assembly. The impeller is rotatively disposed in the housing. The housing includes an egress spout. The fan motor is rigidly connected to the housing. The linkage assembly mechanically relates the oscillation motor to the fan motor and housing and oscillates both. In the preferred embodiment, the motor and housing are rotatably supported on both axial sides of the motor and the motor shaft and motor housing drive substantially the same axis of rotation.

25 Claims, 4 Drawing Sheets

BLOWER ASSEMBLY

BACKGROUND OF THE INVENTION

1. Field of the Invention

The present invention relates generally to vehicle washing facilities and, in particular, the present invention relates to a blower assembly to dry vehicles cleaned in washing facilities.

2. Background of the Invention

Washing assemblies to automatically wash and dry vehicles normally provide a series of wetting, washing, and rinsing cycles. At the conclusion of these cleaning cycles, drying equipment is frequently included to remove moisture from the surface of the cleaned vehicle.

The washing facility owner has an incentive in drying each automobile as quickly as possible to move the maximum number of vehicles per unit of time through the car wash. For customer satisfaction and return business the car must be dried in minimum time. Thus, a drying system that is fast and efficient is extremely important.

Washing facility operators have found that a highly focused and oscillating blast of air is highly efficient for removing water remaining on vehicle surfaces after washing cycles. Attempts have been made to focus air discharges by putting blower outlet nozzles close to the surface of the vehicle. Presently there are many designs which focus and oscillate air discharges for vehicle washing facilities. Moreover, similar designs are present for other applications, such as those which direct focused and oscillating (or rotating) air discharges toward textile equipment. The most relevant of these designs known to the Applicants are discussed hereinbelow.

U.S. Pat. No. 4,161,801, issued to Day et al. Jul. 24, 1979, discloses a fluid stripping apparatus. The apparatus includes a flexible, inflatable bag with a generally rectangular transverse cross-section. The inflatable bag includes an inlet and an elongated opening. The inlet is present to admit pressurized air into the bag. The elongated opening is present at one end of the bag and defines a nozzle and an air distributor. The nozzle emits a stream of air from the bag onto the vehicle. The air distributor supplies the air to the bag and supports the bag so that the bag extends toward the object being dried. The nozzle end of the bag lies in the path of motion of the vehicle, thereby causing physical engagement between the nozzle end of the bag and the vehicle to bring the stream of air emitted from the nozzle into close spatial relationship with the surface of the vehicle. This can cause problems such as causing potential damage to the vehicle surface by contact of the blower output nozzle.

U.S. Pat. No. 4,393,602, issued to Smith Jul. 19, 1983, discloses a vehicle drying machine and method. The vehicle drying machine includes a set of round nozzles. All nozzles are supplied with pressurized air from a plenum to dry the sides and top of a motor vehicle departing the washing apparatus. Each nozzle is employed at an angle and is oscillated for thorough coverage. Preferably the nozzles are slender and cone-shaped so that the air blast remains concentrated at a high velocity for a significant distance away from the nozzle outlet. One disadvantage is that air hoses are required to convey pressurized air from a source to the nozzles. Another disadvantage is that an extensive linkage apparatus is necessary to oscillate the nozzles.

U.S. Pat. No. 4,587,688, issued to Gougoulas May 13, 1986, discloses a proximity detector system for automatic car washer/dryer equipment. The system includes an apparatus for maintaining close proximity between a vehicle surface and a forced air water stripper, without contacting the vehicle surface. Air is supplied to a plenum box from a blower/turbine via a trunk tube. The air is conveyed from the plenum box via a tube to a plurality of nozzles. Each nozzle is preferably provided with small plastic wheels. The wheels are operative only during that portion of the drying cycle when the windshield and backlight of the vehicle are proximate to the nozzle and function to prevent the nozzle from directly contacting, and potentially damaging, the vehicle. However, contact with the vehicle in this manner can nonetheless create the perception of potential damage to the vehicle. An ideal drying system will provide a focused blast of air with the blower nozzle sufficiently separated from the vehicle to eliminate any perception of risk of damage by contact with the vehicle.

U.S. Pat. No. 4,685,169, issued to Nelson Aug. 11, 1987, discloses a vehicle washer and dryer. The apparatus includes a track gantry that moves along a track and over a vehicle being washed. Water outlets and brushes are present on the gantry to wash the car. The apparatus further includes a blower with a nozzle and an oscillator. A flexible coupling connects the nozzle to the fixed blower housing. The nozzle directs air expelled from the blower onto the vehicle. The oscillator periodically changes the orientation of the nozzle and thus alters the direction of the air expelled from the nozzle. One disadvantage is the necessity of an extensive linkage system to oscillate every nozzle. Another disadvantage is that the flexible couplings will need to be replaced if they become brittle due to exposure to light, water, and detergent.

U.S. Pat. No. 5,367,739, the entire disclosure of which is hereby incorporated by reference, issued to Johnson Nov. 29, 1994, discloses oscillating air blowers for drying vehicles. Prior art FIG. 6 illustrates the Johnson configuration. A vehicle drying blower assembly disclosed therein includes a series of oscillating fan housings, each with a discharge nozzle. A centrifugal fan is disposed in each fan housing. Each fan is powered by a blower motor and rotated by a drive shaft. The blower motor is stationary with respect to the fan housing. The fan housing is supported by a rocker arm to pivot the fan housing coaxially with the circular fan drive shaft. The rocker arm further pivots about a bearing assembly which is also coaxial to the drive shaft of the blower motor. A drive motor rotates an eccentric crank arm. Link rods coupled between the eccentric crank arm and the rocker arms simultaneously oscillate each fan housing. Thus, a rather complex, bulky cantilevered rocker arm-link rod assembly is necessary to oscillate the fan housing with respect to the stationary motor. The cantilevered design makes the overall fan housing structure susceptible to damages and misalignment which can present a significant hazard considering the high rate of rotation of such blower motors and fans.

U.S. Pat. No. 3,525,117, issued to Gleaton Aug. 25, 1970, discloses an apparatus for cleaning textile looms. Said patent is incorporated herein by reference. The apparatus includes an overhead crane, a carriage, blower units, means for indexing the carriage on the crane, and means for rotating the blower units. Each blower unit includes a motor disposed between a pair of centrifugal blowers. A single motor shaft extending from the motor rotates both blower fans. Oscillating fan housings are connected to the stationary motors to vary the direction of air streams from the fan housings. A bearing is disposed generally around the motor drive shaft and is used to connect the motor to each fan housing. An inner race of the bearing is fixed to the motor and an outer race of the bearing is connected to the fan housing. The structural support of the fan housing is quite limited and is almost exclusively provided through said bearings. Thus, the assembly may be quite susceptible to damage or misalignment. An oscillating motor is secured to the underside of a plate. An output shaft of the oscillating motor turns a belt which rotates a crank. The crank in turn, rotates a pair of rods. The remote ends of the rods are pinned to the blower crank arms. Actuating the oscillating motor reciprocates the push rods to oscillate the fan housings through limited angular distances. Thus, to provide an oscillating air flow, the fan housing and fan motor are coupled by a bearing which must support the entire weight of the fan housing. Moreover, because the motor is stationary, an extensive linkage system must be present to oscillate the fan housing. Prior art FIG. 5 illustrates the Gleaton configuration.

U.S. Pat. No. 2,976,557, issued to King Mar. 28, 1961, discloses a traveling cleaner for textile machinery. The traveling cleaner includes one or more motors attached to brackets. Each motor includes a horizontal drive shaft extending from each end of the motor casing. A fan is secured to each end of the drive shaft. Blower casing elements surround their respective fans. Each of the blower casing elements has an axial air intake and at least a single, and preferably a pair of, tangential oppositely directed outlet nozzles disposed 180° apart about the axis of the blower. The nozzles direct air streams in opposite directions in a vertical plane. A horizontal shaft is arranged parallel with each motor shaft and extends through the bracket structure on which the motor is mounted. Sprockets are mounted on opposite ends of each shaft and a chain connects each sprocket with a larger companion sprocket in alignment therewith to oscillate or rotate the blower casing. Hence, an extensive additional support frame is necessary to oscillate or rotate the casing with respect to the stationary motor.

There is then a need for a simplified, yet effective and durable, linkage between an oscillating or rotating fan housing and a fan motor and the support frame. There is a particular need for a system which generates an oscillating or rotating air flow, which has an efficient air flow design, and is more robust than known configurations. In one such robust system, the fan housing and fan motor would be held in a substantially rigid relationship and oscillated as a unit.

SUMMARY OF THE INVENTION

In a preferred embodiment, this invention substantially meets the aforementioned needs of the industry by providing a cleaning facility with a washing assembly and an apparatus for generating and directing a flow of air by a centrifugal fan with the fan housing substantially fixed to the motor housing and the pair oscillated.

The apparatus for generating and directing a flow of air is typically adjacent to the washing assembly and includes a fan housing, an air flow generating member, and a fan motor. The fan motor may include a motor body and a drive shaft. The fan housing may define a spout with an egress for directing the generated air flow. The air flow generating member may be an impeller and is disposed in the fan housing. The fan motor drive shaft is coupled to the impeller. The fan motor body is substantially rigidly connected to the fan housing and both are moveable, for example rotatable, with respect to a support frame. A reciprocating powered member may be coupled to one of the motor body and housing for oscillating the housing.

Also provided is a method of making an apparatus for generating and directing a reciprocating flow of air. The method may include:

1) disposing an air flow generating member such as an impeller in a fan housing, the fan housing defining a spout with an opening for air flow egress;
2) substantially rigidly connecting a fan motor to the fan housing, the fan motor including a drive shaft;
3) attaching the fan motor drive shaft to the impeller such that the impeller will generate the flow of air when rotated within said fan housing;
4) rotatably mounting the fan housing and fan motor to a support frame; and
5) securing a reciprocation assembly to one of the fan motor and fan housing for oscillating the fan housing.

It is an object of this invention to provide a fan or blower assembly with a fan motor, a fan housing substantially rigidly connected to the fan motor, an impeller disposed in the fan housing and rotated by the fan motor to generate an air flow, and an oscillating assembly oscillating the connected fan motor and fan housing.

One advantage of this invention is the elimination of extensive, cantilevered fan housing supports otherwise required when the fan housing is oscillated in combination with a stationary fan motor.

A further advantage of this invention is the elimination of bearings previously necessary if a pivoting fan housing is connected directly to a stationary motor. In some configurations, such bearings must bear the weight of the entire fan housing and must also accommodate the fan drive shaft therewithin. This problem is overcome.

Another advantage is the availability of a narrower gap between the fan housing and the impeller in this invention. When a fan housing is oscillated in an assembly with a stationary motor, the gap between the impeller and fan housing interior surface must be large to accommodate vibrations and movement between the impeller and the fan housing. A large gap decreases the amount of air directed into the desired air flow and the fan efficiency. The narrower gap of this invention maximizes the amount of air directed into the air flow and, thereby enables the air flow to be generated more efficiently.

It is another advantage of this invention that the fan housing and the substantially rigidly connected fan motor are oscillated by a relatively simple oscillating linkage assembly.

It is a further advantage of this invention that the utility of the substantially rigidly connected fan motor and fan housing is more flexible and can be used in a greater variation of equipment than previous designs. The design of this invention includes the fan motor being rotationally supported between two support structures. However, as shown herein, the support structures can be located to accommodate virtually any contemplated structural geometry.

BRIEF DESCRIPTION OF THE DRAWINGS

FIG. 5 is a side view of one embodiment of the prior art;

DETAILED DESCRIPTION OF THE PREFERRED EMBODIMENTS

Figure 1:
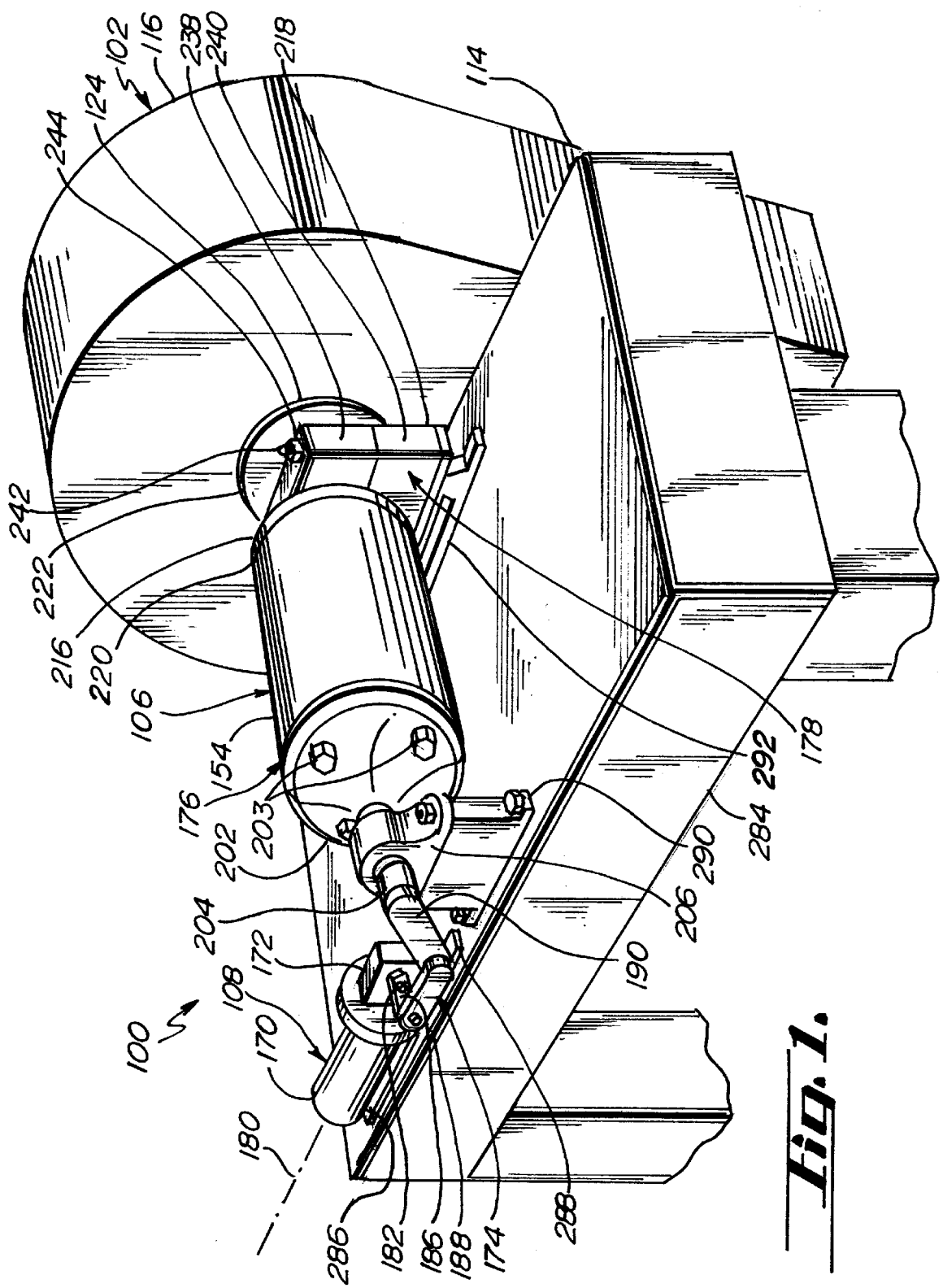
FIG. 1 is a perspective view of a first embodiment of a blower assembly of this invention.

FIG. 5 depicts one embodiment of the prior art denoted as blower assembly 10. In this prior art embodiment, motor 12 is fixed to support 14. Motor shaft 16 rotates fan 18 within fan housing 20. Bearing 22 rotatably attaches motor 12 to fan housing 20. An inner race of bearing 22 is fixed to member 24. Member 24, in turn, is fixed to motor 12 and houses a portion of motor shaft 16 extending between motor 12 and fan housing 20. An outer race of bearing 22 is attached to bracket 26, which is attached to fan housing 20. Arm 28 extends from fan housing 20 and is coupled to a linkage 30. The linkage 30 is reciprocated by a separate motor (not shown) to oscillate fan housing 20. Hence, the fan motor is fixed and the fan housing is rotatably attached to the fan motor. In order to rotate the fan housing with respect to the stationary motor, the bearing must support the entire weight of the fan housing as well as provide a passage for the drive shaft. Failure of the bearing could conceivably damage the drive shaft or disconnect the fan housing from the motor.

Figure 6:
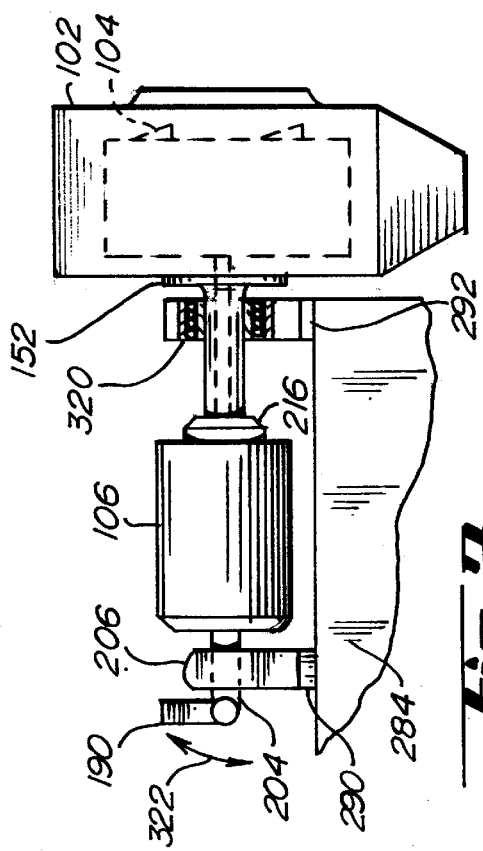
FIG. 6 is a side view of another embodiment of the prior art.

In FIG. 6, another embodiment of the prior art is depicted as blower assembly 40 and includes a motor 42, a fan 44, a fan housing 46, and a rocker arm assembly 48. The motor 42 includes a drive shaft 50, which extends through an opening in fan housing 46 and rotates fan 44. The motor 42 is fixed to a support 52. The fan housing 46 is supported and reciprocated by the rocker arm assembly 48. The rocker arm assembly 48 includes a generally L-shaped rocker arm 54, a plurality of hinges 56, and a frame member 58. One end of the rocker arm 54 is attached to the fan housing 46 and the other end is fixed to hinges 56. Hinges 56 connect the rocker arm 54 to the frame member 58 and allow the rocker arm to be reciprocated with respect to the stationary motor 42. The hinges 56 are also aligned with drive shaft 50. An arm 60 attaches the rocker arm to a reciprocating source of power via linkage 62. Because the fan housing is attached to the rocker arm, reciprocating the rocker arm reciprocates the fan housing as well. And because the hinges are aligned with the drive shaft, the housing is reciprocated about the drive shaft. Hence, this prior art embodiment also features a fixed fan motor and a reciprocating fan housing. In order for the fan housing to rotate about the drive shaft of a fixed motor, the fan housing must be both supported and oscillated by a rocker arm. The rocker arm must be cantilevered from the hinges to extend around the fan motor to support the fan housing, yet must pivot such that the fan housing is oscillated about the drive shaft. In this design, the entire weight of the fan housing and all or most of the weight of the cantilevered rocker arm must be supported by bearings.

The present invention provides a solution to the problems inherent in supporting a fan housing which directs an oscillating air flow and which houses a fan rotated by a stationary motor. This invention also avoids the need to cantilever the fan housing or rotatably couple the fan housing to the motor with a bearing unit. This invention advantageously provides a simple robust design in which the fan motor and the fan housing are substantially, rigidly coupled, the fan motor and the fan housing are oscillated as a unit, and the fan motorfan housing unit is rotatably supported on a support surface. An additional advantage of rigidly coupling the fan motor and fan housing is that a closer tolerance can now exist between the impeller and the adjacent interior surfaces of the fan housing than was heretofore possible. The closer tolerance enables enhanced efficiencies when generating air flows.

Referring to FIGS. 1–4, an exemplary blower assembly of this invention is depicted generally by the numeral 100 and includes a fan (blower) housing 102, an impeller 104 (FIG. 2), a fan motor 106, and an oscillating assembly 108. With respect to the housing 102, an egress member 114 depends from the housing main portion 116 and terminates in a spout 118. The spout 118 defines an egress opening 120. The main portion 116 of housing 102 has a shaft opening 124 and a suction opening 126. A bracket 128 fixes a screen 130 over suction opening 126.

In this embodiment, the impeller 104 has a plurality of blades 136 bonded between respective first and second members 138 and 140. A mounting element 142 is attached to the second member 140 in this embodiment and defines a bore 144. When the impeller 104 is rotated, an air flow is centrifugally generated by action of blades 136 and exits the fan housing at spout 118.

The exemplary fan motor 106 has a drive shaft 152 and a motor body 154. Threads 156 are formed on an outboard portion of drive shaft 152. Drive shaft 152 is connoted to the impeller 104 by being accommodated in bore 144 and secured therein by a nut 158. The fan motor 106 is suitably a 15 horsepower conventional electric motor. A gap 160 is defined between the fan housing 102 and the impeller 104.

Figure 2:
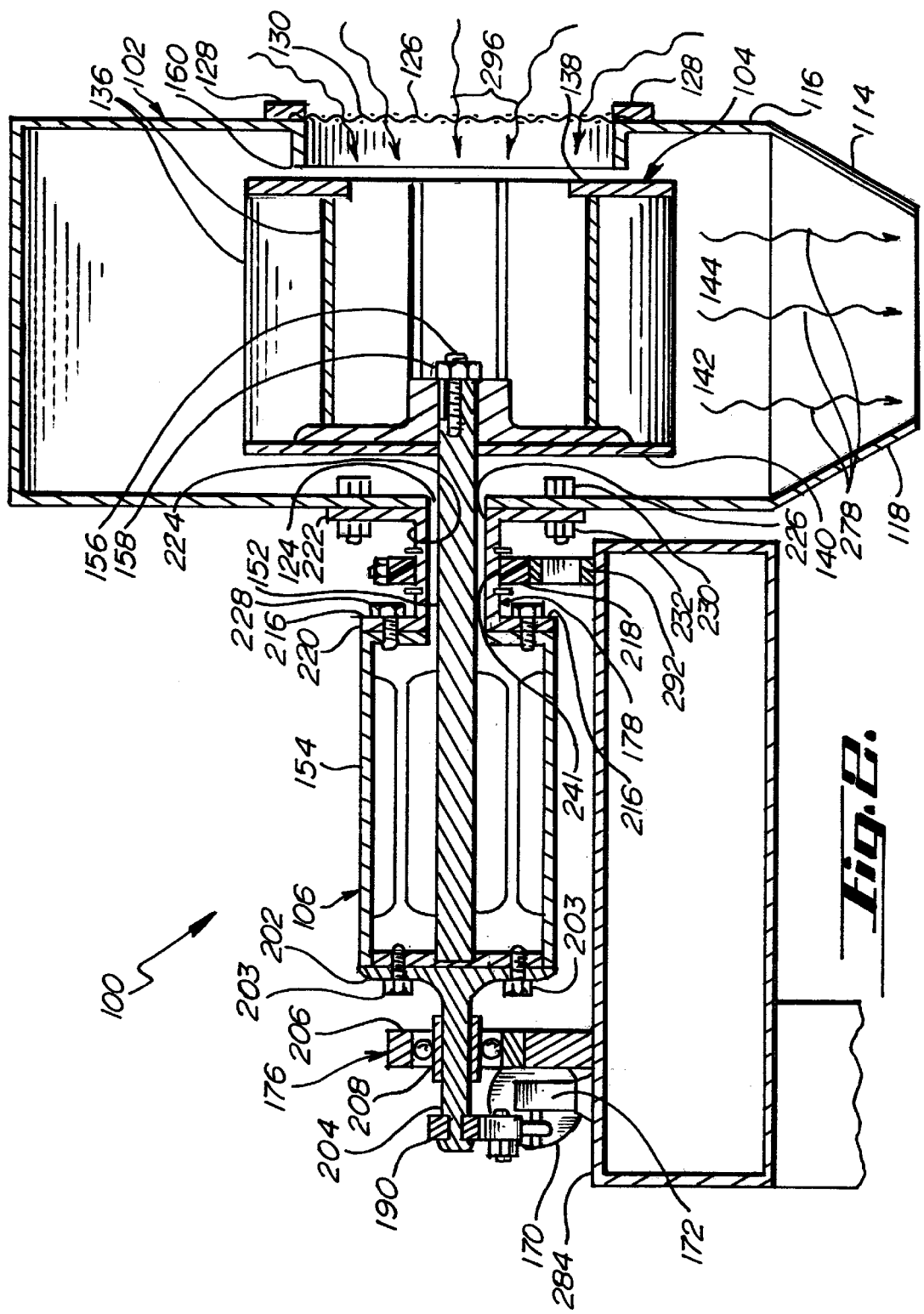
FIG. 2 is a fragmentary cross-sectional view of the blower assembly of FIG. 1.

Referring mainly to FIGS. 1 and 2, oscillating assembly 108 includes an oscillator motor 170, a gear box 172, a linkage assembly 174, and respective first and second connecting assemblies 176 and 178. The oscillator motor 170 includes a drive shaft (not depicted) rotating substantially about longitudinal axis 180. The oscillator motor is operably coupled to a gear box 172 such that the rotary motion generated by the oscillator motor drive shaft is translated generally transversely to rotate shaft 182 of gear box 172. The gear box 172 may also effect a reduction in rotation speed as rotary motion from the oscillator motor drive shaft is translated to rotate the shaft 182.

With respect to the linkage assembly 174, a first end of arm 186 is affixed to shaft 182. The second end of arm 186 is pivotally attached proximate a first end of a first oscillator member 188. The second end of the first oscillator member is pivotally attached to a first end of a second oscillator member 190.

The first connecting assembly 176 includes a plate 202, a shaft 204, and a bearing 206. The plate 202 is rigidly coupled to an outboard end of the motor body 154 by a plurality of fasteners such as bolts 203. The shaft 204 may unitarily, or otherwise rigidly, extend from the plate 202 and is rotatably (pivotally) accommodated within an inner race 208 of bearing 206. The second end of the second oscillator member 190 is rigidly coupled to a portion of the shaft 204 at a location outboard of bearing 206. Rigidly coupled or connected is contemplated to include structures which are either directly or indirectly connected or which are otherwise in a substantially rigid relationship.

The second connecting assembly 178 includes a spool 216 and a bearing member, such as yoke 218. The spool 216 is substantially unitary in this embodiment, but may be considered to include respective first and second plate members 220 and 222 and axial member 224, which extends between plate members 220 and 222. Spool 216 has a generally axial bore 226 therewithin. First plate member 220 is mounted to an inboard end of motor body 154 by fasteners such as bolts 228. Second plate member 222 is affixed to the main portion of housing 102 by fasteners, such as a plurality of bolts 230 and nuts 232. The spool affixes to housing 102 such that the bore 226 aligns with the shaft opening of housing 102. The drive shaft 152 extends through the bore of spool 216, through the shaft opening 124, and into housing 102. Thus, the spool substantially rigidly connects motor 106 to housing 102 and further accommodates the portion of the drive shaft extending between the motor 106 and the fan housing.

The axial member of spool 216, in turn, may be pivotally disposed within the yoke 218. Respective first and second members 238 and 240 of yoke 218 cooperate to define an aperture 241 accommodating axial member 224 therewithin. Optionally, the spool may be accommodated within a bearing inner race (not shown) and the bearing may be secured in the yoke aperture. First and second members 238 and 240 of the yoke may be secured together by fasteners such as bolts 242 and nuts 244. In a preferred embodiment, the supports, such as bearing 206 and yoke 218 are generally aligned with the fan motor drive shaft to minimize rotational or gyrational torque effects from the fan during operation. The yoke may be secured to a support member as described below.

Figure 3:
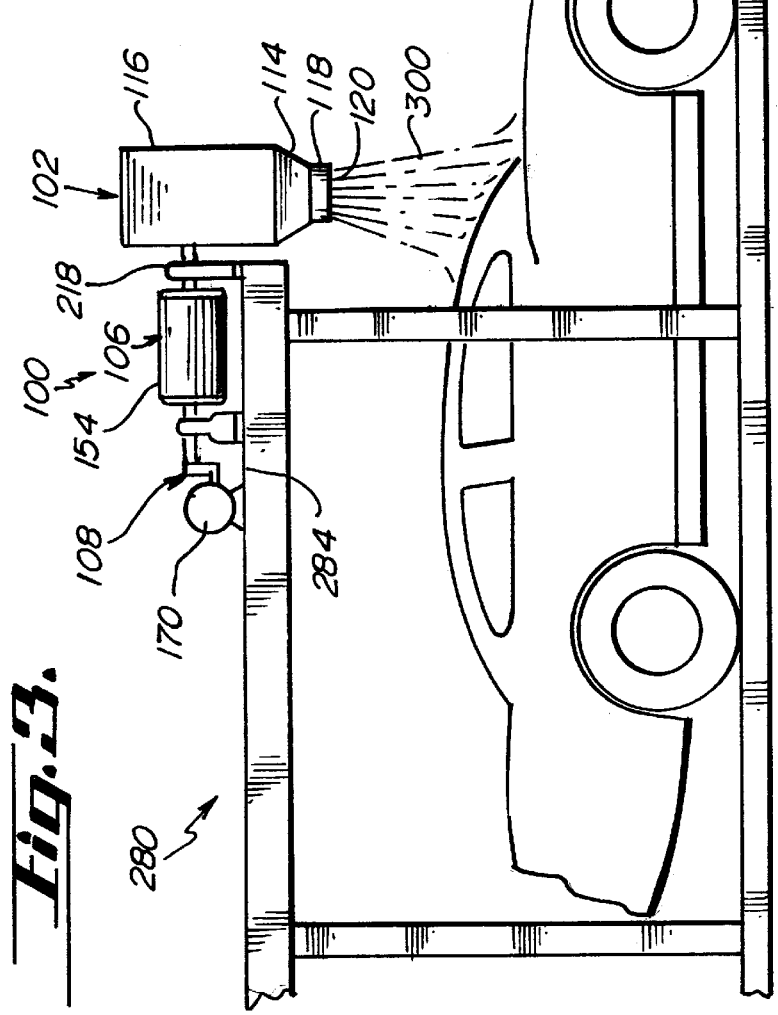
FIG. 3 is a side view of the blower assembly of FIG. 1 operatively installed in a vehicle washing facility.

The blower assembly of this invention may be advantageously utilized in connection with a vehicle washing (cleaning) facility such as depicted in FIG. 3 at 280. In addition to the blower assembly of this invention, the washing facility may include mechanical cleaning equipment. By non-limiting illustration, the blower assembly 100 is shown mounted on support (frame) member 284 of the washing facility. Obviously blower assembly 100 may be disposed at one or more other locations on washing facility 280 as well. The oscillator motor 170, gear box 172, bearing 206, and yoke 218 may be substantially rigidly affixed to support member 284 by respective brackets 286, 288, 290, and 292 (FIG. 1).

In operation, the fan motor 106 is actuated, thereby rotating the impeller 104. In response to the impeller rotation, air enters the suction opening of the housing in the direction of arrows 296 and an air flow in the direction of arrows 298 is centrifugally generated. The air flow exits housing 102 at spout 118 and is indicated in FIG. 3 at 300.

Figure 4:
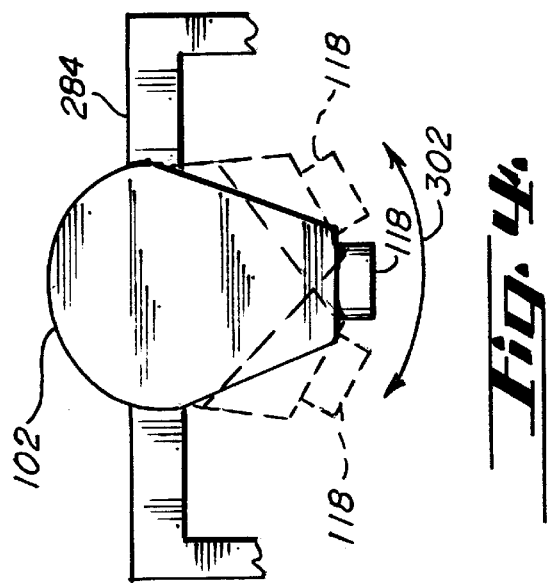
FIG. 4 is fragmentary front view of the washing facility of FIG. 3 in which a housing of the blower assembly of this invention is being oscillated.

To oscillate the air flow 300, the oscillator motor 170 rotates shaft 182 of gear box 172. The shaft 182, in turn, rotates arm 186. The rotary motion of arm 186 is translated into oscillatory motion of shaft 204 by a cooperation between pivotally coupled first and second oscillator members 188 and 190. The shaft 204 is unitary to plate 202 in this embodiment and plate 202 is rigidly connected to fan motor 106. The fan motor, in turn, is rigidly connected to the fan housing via the spool. Hence, oscillating shaft 204 simultaneously oscillates both the fan motor and the fan housing. The oscillation of the fan housing is depicted in FIG. 4 in phantom and by arrow 302. The angle of oscillation may be determined, e.g., by relative lengths of arm 186 and first and second oscillator members 188 and 190. The fan housing (as well as the fan motor) may be rotated rather than oscillated when minor modifications to the described embodiments are performed. Moreover, the fan housing may also be oscillated by simply connecting linkage assembly 174 directly to the fan housing.

Operatively, a vehicle 306, having been washed by washing facility 280, is driven slowly forward as the air flow from one or more blower assemblies 100 removes and evaporates remaining moisture from external surfaces thereof. The oscillation of the fan housing provides a sweep angle to direct the air flow for complete coverage of vehicle 306.

Figure 7:
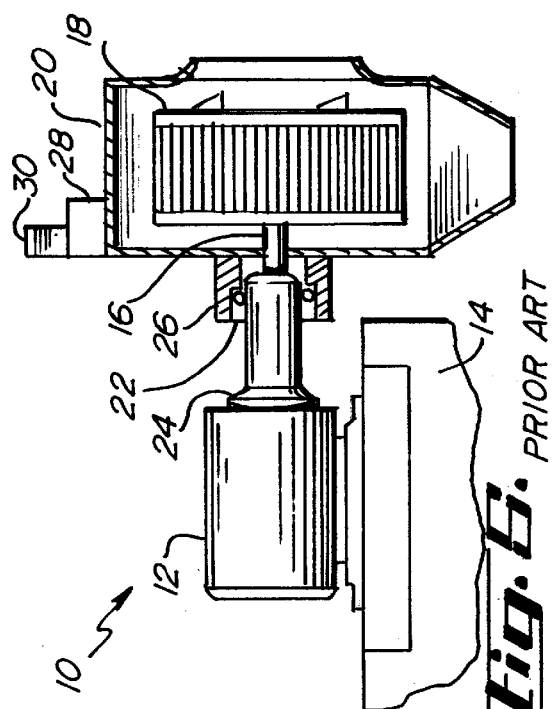
FIG. 7 is a side view of a second embodiment of the blower assembly of this invention.
Figure 8:
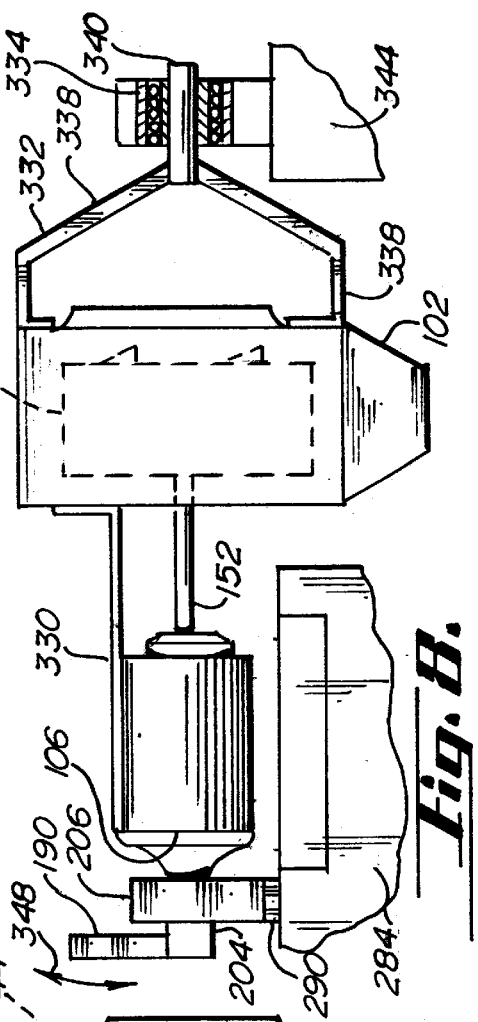
FIG. 8 is a side view of a third embodiment of the blower assembly of this invention.
Figure 8:
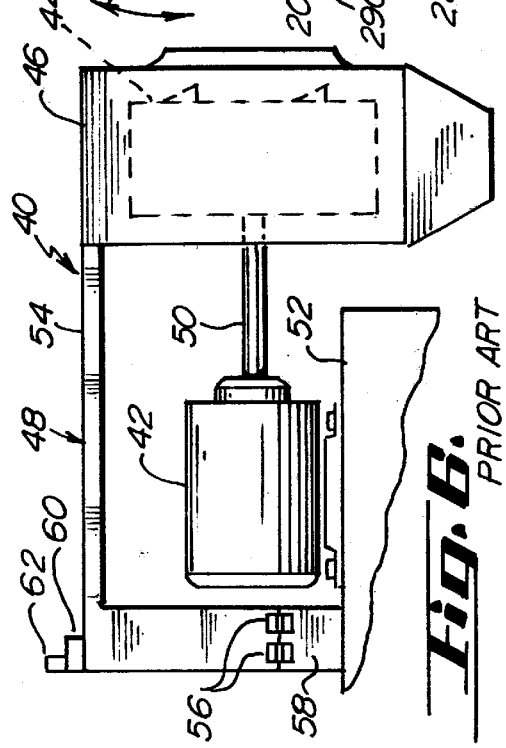

Two further embodiments illustrative of this invention are depicted in FIGS. 7 and 8. In FIG. 7, the fan motor 106 and fan housing 102 are rigidly connected together by spool 216 and are rotatably supported by a bearing 206 and a bearing 320. As in a previous embodiment, the shaft 204 is rotatably supported in bearing 206 and is rigidly coupled to the second oscillator member 190. An inner race of the bearing 320 may enclose the spool to rotatably support the fan motor and fan housing when they are oscillated as indicated by arrow 322.

Referring to FIG. 8, the shaft 204 is supported within the bearing 206 in a manner similar to that described above. However, a support element 330, a bracket 332, and a bearing 334 are present in place of the yoke 218. The support element 330 is generally L-shaped in this embodiment and is rigidly coupled to the fan motor 106 and the fan housing 102. The bracket 332 includes a plurality of bracket elements 338, which converge at shaft 340. In this embodiment, shaft 340 generally aligns with drive shaft 152. The shaft 340 is rotatably supported by a bearing member, such as a bearing 334. The bearing 334, in turn, is affixed to a stationary support 344. The fan motor and fan housing are substantially rigidly connected by the support element 330 and the bracket 332 rigidly extends from the fan housing. Thus, the fan motor and fan housing are substantially rigidly connected, or otherwise in a substantially rigid relationship, and are rotatably supported by bearings 206 and 334 as the fan motor and fan housing are oscillated as indicated by arrow 348.

In a still further embodiment, the shaft 204 may be rotatably supported by bearing 206 and the spool may be rotatably supported by a bearing such as yoke 218. However, bearing 206 and yoke 218 are affixed to an underlying plate. The underlying plate is hinged to support 284. Second arm 190 is coupled to the plate in a manner allowing the plate to be oscillated. Thus, the fan motor and the fan housing are fixed in a substantially rigid relationship and are oscillated along with the underlying plate.

Because numerous modifications of this invention may be made without departing from the spirit thereof, the scope of this invention is not to be limited to the embodiments illustrated and described. Rather, the scope of this invention is to be determined by appended claims and their equivalents.

When used herein, connected, attached, linked, coupled, and similar connective words do not require direct physical contact or direct connection between the respective components. Intermediate components may also be present.

What is claimed is:

1. A vehicle cleaning facility, comprising:
a vehicle washing assembly; and
an apparatus for generating and directing a flow of air onto the vehicle, the apparatus in operative relation to the washing assembly and including a fan housing, an impeller, a motor including a motor body and a drive shaft, first and second supports, and a powered member, the fan housing defining a fixed spout for directing the generated air flow, the impeller disposed in the fan housing and coupled to the drive shaft, the motor body disposed generally between the first and second supports, substantially rigidly connected to the fan housing and including first and second ends, both the motor body and fan housing supported by the first and second supports, the powered member coupled to one of the motor body and fan housing for oscillating said first motor body and said fan housing.

2. The facility of claim 1, further comprising a frame member rigidly connected to the powered member.

3. The facility of claim 2, wherein said first and second supports are attached to the frame member.

4. The facility of claim 3, wherein said air flow generating and directing apparatus further comprises a plate coupled to the motor body, a pivot shaft substantially rigidly extending from the plate, and the first support includes a first bearing and a vertical member, the first bearing rotatively accommodating the pivot shaft and rigidly coupled to the vertical member.

5. The facility of claim 3, wherein said air flow generating and directing apparatus further comprises a spool and a second bearing, the spool substantially rigidly coupled to the motor body and to the fan housing and accommodating the motor drive shaft therewithin, at least a portion of the spool disposed within the bearing, the bearing rigidly coupled to the second support.

6. The facility of claim 5, wherein said air flow generating and directing apparatus further comprises a plate, first and second linkage members, and a pivot shaft, the plate coupled to the motor body, the pivot shaft extending from the plate and pivotally supported by the first support, the first and second linkage members driven by the powered member and in an oscillating mechanical relationship with the pivot shaft.

7. A facility for generating and directing a flow of air, comprising:
   a fan housing defining a spout for air flow egress;
   an impeller disposed in the fan housing and configured to generate the flow of air when rotated;
   a fan motor substantially rigidly connected to the fan housing and including a drive shaft for rotating the impeller;
   a powered member coupled to one of the motor and fan housing for oscillating said fan housing; and
   first and second supports, the fan motor disposed generally between said first and second supports, said first and second supports supporting the fan motor and fan housing.

8. The facility of claim 7, wherein the motor comprises a motor body in a substantially rigid relationship with the fan housing.

9. The facility of claim 8, further comprising a bearing, a plate, and a pivot shaft, said plate attached to the motor body, the pivot shaft rigidly extending from the plate, pivotally disposed within the bearing, and oscillated by the powered member.

10. The facility of claim 8, further comprising a spool and a bearing, the spool rigidly connected to the motor body and the housing and at least partially accommodated within the bearing.

11. The facility of claim 9, further comprising first and second linkage members, the first linkage member rigidly connected to the pivot shaft, the second linkage member driven by the powered member and configured to reciprocate the first linkage member.

12. An apparatus for generating and directing a flow of air, comprising:
   a motor including a drive shaft and a motor body;
   an impeller configured to be rotated by the drive shaft;
   a fan housing substantially rigidly connected to the motor body, accommodating the impeller, and defining an opening for egress air flow; and
   means for oscillating the air flow generated by said impeller, said airflow oscillating means simultaneously oscillating the motor and the fan housing.

13. The apparatus of claim 12, wherein said oscillating air flow means comprises a powered member substantially rigidly connected to a frame member.

14. The apparatus of claim 13, wherein said oscillating air flow means further comprises a first bearing, a plate, and a pivot shaft, said plate attached to the motor body, the pivot shaft rigidly extending from the plate and pivotally accommodated by the first bearing, the pivot shaft being pivoted by the powered member.

15. The apparatus of claim 14, wherein said oscillating air flow means further comprises first and second linkage members driven by the powered member and cooperating to oscillate the pivot shaft.

16. The apparatus of claim 15, wherein said oscillating air flow means further comprises a spool and a second bearing, the spool rigidly connected to the motor body and the housing and accommodating the motor drive shaft therewithin, at least a portion of the spool pivotally disposed within the second bearing.

17. A method of making an apparatus for generating and directing a flow of air, comprising:
   disposing an impeller in a housing, the housing defining a spout for air flow egress;
   rigidly connecting a first motor to the housing, the first motor including a drive shaft;
   attaching the first motor drive shaft to the impeller such that the impeller will generate the flow of air when rotated within said housing; and
   securing an oscillation assembly to one of the first motor and housing for oscillating the housing and motor simultaneously.

18. The method of claim 17, in which the oscillation assembly is secured to the first motor.

19. The method of claim 17, in which the oscillation assembly is secured to the housing.

20. The method of claim 17, further comprising securing the oscillation assembly to a frame member.

21. The method of claim 20, wherein the oscillation assembly includes a second motor and further comprising connecting the second motor to a linkage combination and attaching the linkage combination to one of the first motor and the housing.

22. The method of claim 21, further comprising securing the second motor to the frame member.

23. The method of claim 17, further comprising connecting the first motor to a shaft pivotally disposed in a first bearing, the first bearing rigidly connected to a frame member.

24. The method of claim 17, further comprising connecting the first motor and housing with a spool, the spool accommodating the first motor drive shaft therewithin, and at least partially disposing the spool within a bearing rigidly connected to a frame member.

25. An apparatus for generating and directing an oscillating air flow toward a vehicle in a vehicle washing facility, comprising:
   first and second supports;
   a fan housing comprising a spout for directing the air flow toward the vehicle;
   a fan motor substantially rigidly connected to the fan housing and including a drive shaft, the fan motor generally disposed between, and supported by, the first and second supports;
   an impeller accommodated in the fan housing and therein rotated by the drive shaft to generate the air flow; and
   an oscillating assembly configured to oscillate the fan motor and the fan housing simultaneously.

* * * * *